May 13, 1952     R. LAPSLEY     2,596,700
TRANSMISSION
Original Filed March 15, 1944     7 Sheets-Sheet 1
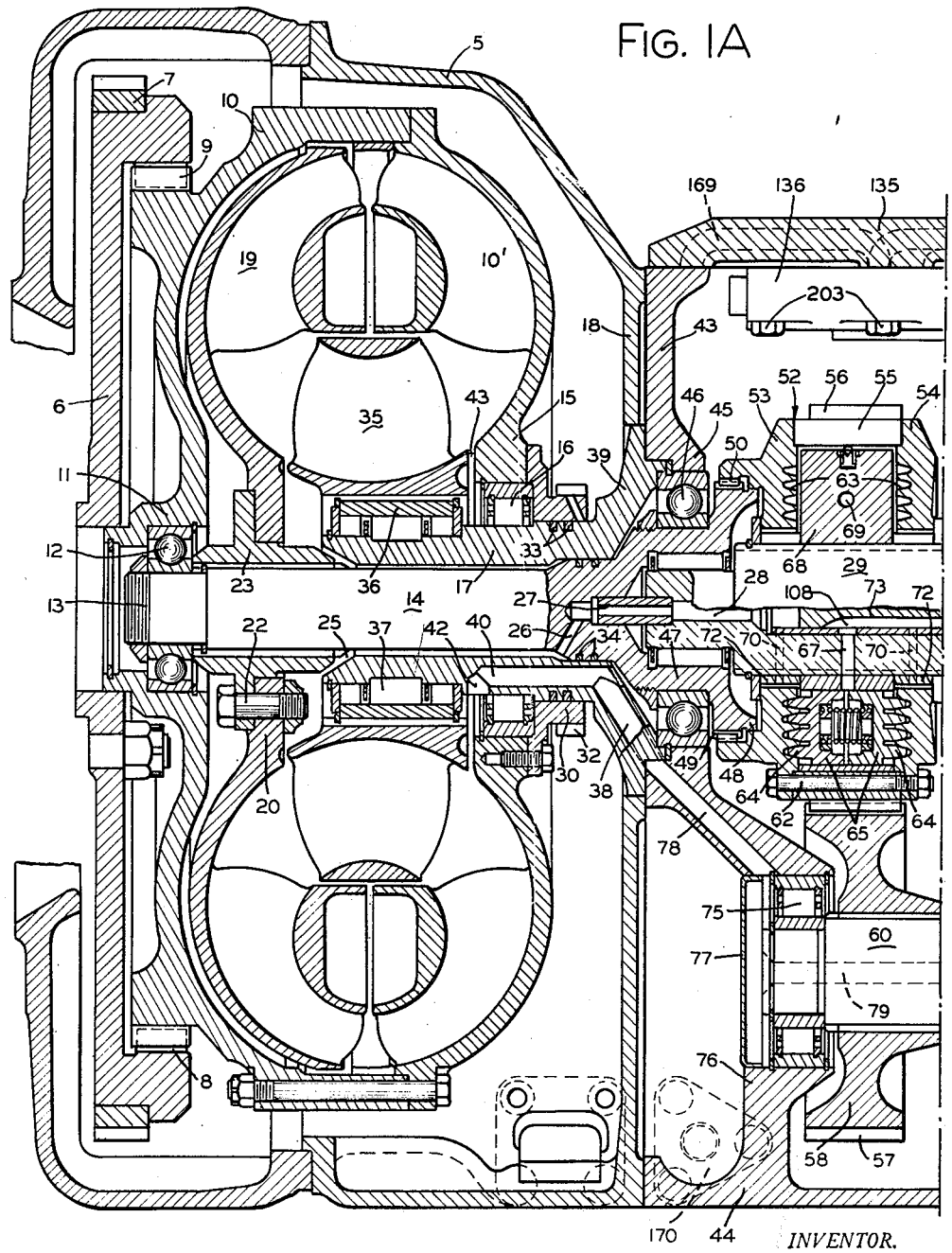
FIG. IA
INVENTOR.
ROBERT LAPSLEY
BY
ATTYS.

INVENTOR.
ROBERT LAPSLEY

May 13, 1952     R. LAPSLEY     2,596,700
TRANSMISSION

Original Filed March 15, 1944     7 Sheets-Sheet 3

INVENTOR.
ROBERT LAPSLEY
BY
ATTYS.

INVENTOR.
ROBERT LAPSLEY
BY
ATTYS.

May 13, 1952 R. LAPSLEY 2,596,700
TRANSMISSION
Original Filed March 15, 1944 7 Sheets-Sheet 5

INVENTOR.
ROBERT LAPSLEY
BY
ATTYS.

May 13, 1952  R. LAPSLEY  2,596,700
TRANSMISSION
Original Filed March 15, 1944  7 Sheets-Sheet 6

INVENTOR.
ROBERT LAPSLEY
BY
ATTYS.

May 13, 1952 R. LAPSLEY 2,596,700
TRANSMISSION
Original Filed March 15, 1944 7 Sheets-Sheet 7

INVENTOR.
ROBERT LAPSLEY
BY
ATTYS.

Patented May 13, 1952

2,596,700

UNITED STATES PATENT OFFICE 2,596,700

TRANSMISSION

Robert Lapsley, Buchanan, Mich., assignor to Clark Equipment Company, Buchanan, Mich., a corporation of Michigan Original application March 15, 1944, Serial No. 526,829. Divided and this application March 31, 1951, Serial No. 218,603.

9 Claims. (Cl. 74—731)

My present invention relates generally to transmissions, and, more specifically, is directed to control means for a fluid torque converter and gear means driven therefrom.

This is a divisional application of my copending application, Serial No. 526,829, filed March 15, 1944.

The control means of my present invention, may, for example, be used in connection with the transmission forming the subject matter of my above identified copending application. This transmission comprises input and output shafts with first gear means between the input and output shafts for effecting a low speed drive to the output shaft. The first gear means includes a gear rotatable on the output shaft which is adapted to be coupled thereto by means of suitable internal pressure responsive clutch means. High speed drive to the output shaft is effected by internal pressure responsive clutch means between the input and output shafts. The input shaft of the transmission is driven by the driven element of a conventional fluid torque converter and the drive element of the fluid torque converter is, in turn, driven by an internal combustion engine.

It is an object of my present invention to provide a control valve mechanism for selectively admitting fluid under pressure to fluid pressure responsive clutch means for effecting one of a plurality of drive ratios to a transmission output shaft.

In the specific embodiment of my present invention, the control valve mechanism is adapted to selectively admit fluid under pressure to the internal pressure responsive clutch means of the transmission described above for effecting either low speed drive or high speed drive to the transmission output shaft.

It is another object of my present invention to provide a fluid pump driven by the transmission for selectively actuating the control valve mechanism in accordance with the engine speed.

It is a further object of my present invention to provide a fluid circuit comprising a fluid reservoir and a fluid pump driven by the driven element of the fluid torque converter which fluid pump includes a first stage for drawing fluid from the reservoir and delivering the fluid under pressure to the converter and a second stage for receiving a portion of the fluid under pressure from the first stage and delivering the fluid under a higher pressure to the control valve mechanism where it is subsequently directed to one of the internal pressure responsive clutch means.

It is a still further object of my invention to provide a fluid circuit of the character noted, wherein the fluid pump includes a third stage for returning leakage fluid to the fluid reservoir.

Now, in order to acquaint those skilled in the art with the manner of constructing and using the devices of my present invention, I shall describe in connection with the accompanying drawings a preferred embodiment of my invention.

In the drawings:

Figure 1A is an elevational sectional view of a torque converter and one gear train of a preferred embodiment of the invention;

Figure 1B:
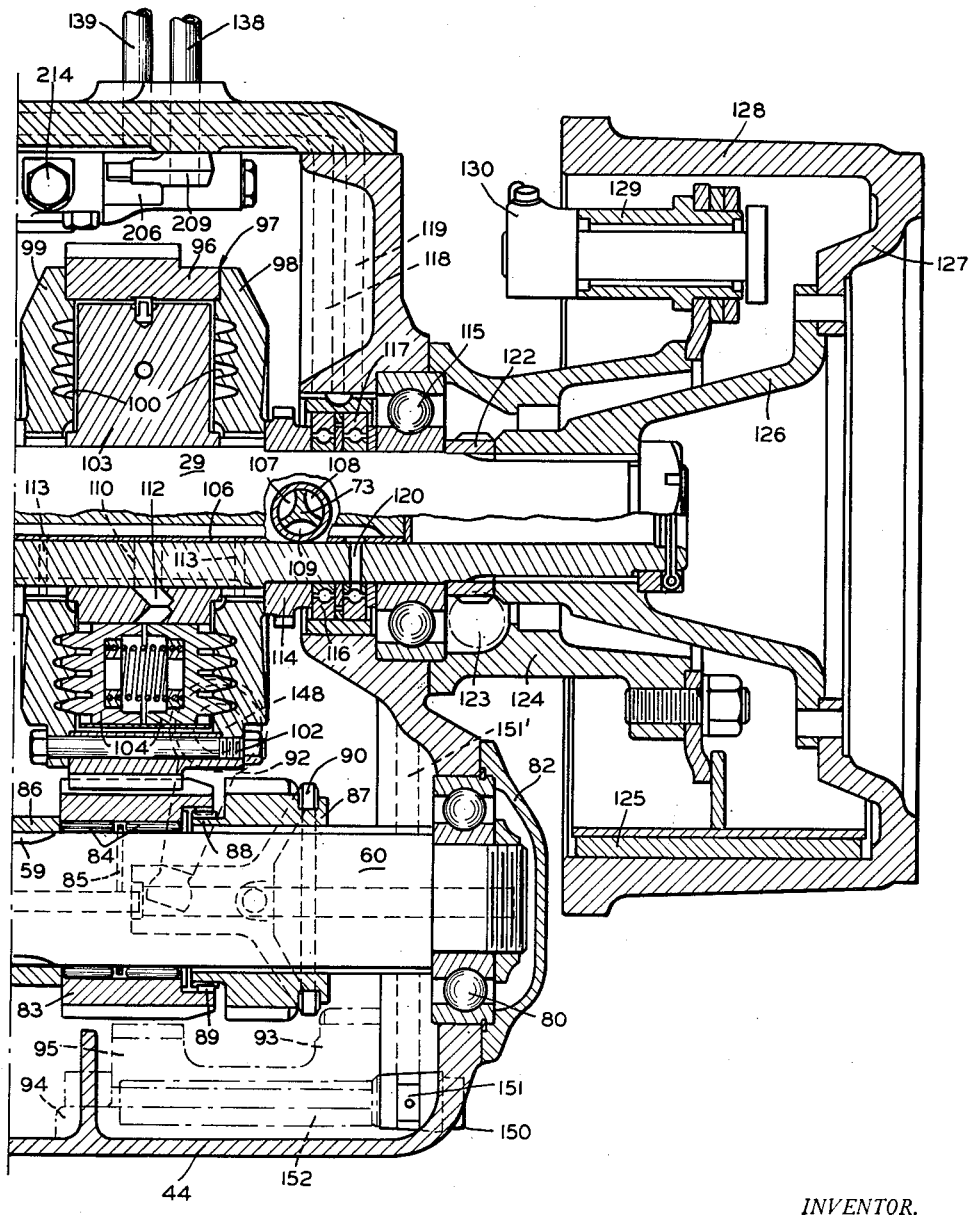
Figure 1B is a continuation of Figure 1A showing the second gear train and the reverse control mechanism.

Referring now in detail to the drawings, the torque converter portion of the transmission is enclosed within a suitable housing 5, joined or otherwise secured to the crank case of the engine. Within the housing 5 there is a flywheel portion 6 bolted or otherwise secured to the crank shaft of the engine and carrying at its outer periphery the ring gear 7 arranged as a starter gear.

The member 6 is also provided with a internal gear portion 8 meshing with an external gear portion 9 of the impeller member 10 of the torque converter. The impeller member 10 has a first hub portion 11 mounted as by means of the bearings 12 upon the reduced end 13 of a driving shaft 14 constituting an input shaft to the gear unit portion of the transmission. At its opposite side the impeller member 10 has a second hub portion 15 mounted by means of suitable bearings 16 upon a flanged sleeve 17 bolted or otherwise suitably secured in the end wall 18 of the housing 5.

The rotor or driven member of the torque converter is indicated generally at 19, and includes a hub portion 20 secured as by means of the bolts 22 to a flanged sleeve 23 splined upon the shaft 14 and serving at one end as a bearing retainer support for the bearing assembly 12. The sleeve 23 is axially spaced relative to the sleeve 17 to provide an annular channel 25 therebetween, whereby leakage fluid from the torque converter can pass through this channel and along the external surface of the shaft 14 to the passageway 26 which leads into axial bushing 27 opening into an axial bore 28 in the output shaft 29 for a purpose to be described hereinafter.

Bolted or otherwise secured to the second hub portion 15 of the impeller member is a flanged gear 30 having a gear portion 32 adapted to drive a suitable pump, the details of which are not believed pertinent to the present invention. Secured between the internal hub surface of the member 30 and the sleeve 17 are a pair of oil sealing rings 33 to prevent leakage therebetween and similar sealing rings 34 are provided between the sleeve member 17 and the enlarged portion of shaft 14 posterior to the passageway 26.

Intermediate the rotor and the hub portion 15 of the impeller is a stator member 35 which has a hub portion splined or otherwise suitably secured to the outer race 36 of a roller bearing assembly 37 comprising a one-way brake construction which prevents reverse rotation of the stator 35 but allows it to rotate forwardly with the rotor and impeller when torque multiplication is no longer necessary. This construction is somewhat conventional, and it is not believed necessary to describe it in detail.

While the torque converter is of more or less conventional form, it has been found desirable to provide a torque converter in which the impeller portion 10' is of substantially the same construction and size as the rotor portion 19, thereby providing substantially equal portions for the movement of fluid between these two members. Fluid for operating the impeller is delivered thereto through a passageway 38 extending through the flanged end 39 of the sleeve 17, and thence through the passageway 40 and the port 42 into the annular space 43 between the hub of the stator 35 and the hub portion 15 of the impeller 10. This fluid is delivered under a suitable pressure from one portion of the pump driven by the gear 32, the pressure preferably being of the order of 30 to 35 pounds per square inch in one embodiment of the invention.

Bolted or otherwise suitably secured to the end wall 18 of the housing 5 is the end wall 43 of the gear box or transmission case 44. This gear box has a boss portion 45 receiving a suitable bearing assembly 46 whereby the enlarged end 47 of the shaft 14 is rotatably supported in the housing 44. The extreme end of the shaft 14 is further enlarged as indicated at 48 and provided with an external clutch portion 49 adapted to receive the internal clutch portion 50 of the gear member indicated generally at 52. The gear member 52 is composed of two radially extending flange portions 53 and 54, and the intermediate external gear portion 55 having the gear teeth meshing with the gear teeth 57 of the gear member 58 splined upon the splines 59 of the countershaft 60. The intermediate gear portion 55 of the gear 52 is secured into position by a circumferential series of studs 62 and the adjacent faces of the flange members 53 and 54 are provided with annular serrations 63 adapted to receive corresponding serrated ends 64 of oppositely arranged piston member 65, the piston members being normally adapted to be contracted into position by the spring 66 and being spread apart by oil pressure introduced into the radial passageway 67 in the shaft 29 and entering between the pistons and operating to move them laterally into clutching engagement with the serrations 63 when it is desired to clutch the gear 55 to the shaft 29. The intermediate member 68 which carries the circumferential series of piston 65 is splined upon the shaft 29, and is preferably provided with an annular port 69 providing a manifold for connecting the respective pistons to the source of fluid pressure.

This particular clutching arrangement and the operation thereof is described in detail in the patent to Schneider No. 2,333,682 issued November 9, 1943.

It will thus be apparent that the gear 55 is at all times driven from the shaft 14, and in turn drives the gear 58 on the countershaft 60 whenever the shaft 14 is being rotated by the torque converter.

The oil passageway 26 and bushing 27 provides suitable means for allowing leakage oil from the torque converter to enter the axial bore 28 of the shaft 29. This oil is arranged to pass through suitable ports 70 formed radially in the shaft 29 and the bushings 72 for lubricating the hub portions of flanges 53 and 54, it being understood that these passageways are separated from the passageway through which fluid is introduced to port 67 by means of the separator member 73 disposed within the internal bore in the shaft 29 and provided with three fluted openings as indicated in section in Figure 1B.

The countershaft 60 is mounted at its forward end in the roller bearing assembly 75 secured in the offset partition portion 76 of the housing 44. The end of the bearing assembly and the opening in the partition 76 is closed by means of the member 77, and a suitable passageway 78 leads from the torque converter housing 5 to draw leakage fluid from the converter through the passageway 78 of the bearing 75 and to the axial bore or passageway 79 formed in the countershaft. The opposite end of the countershaft is supported in the ball bearing assembly 80 which is lubricated by discharge from the passageway 79 into the bearing cap 82 overlying the end of shaft 60 and secured to the rear end wall of the transmission housing 44.

In addition to the gear 58 keyed to the countershaft 60 there is a second gear 83 rotatably mounted upon the countershaft by means of the needle bearings 84, these bearings being lubricated by radial port 85 extending from the passageway 79 to the bearings 84. A suitable separator member 86 is interposed between the gears 58 and 83 as shown in Figure 1B.

Mounted in splined engagement upon the shaft 60 is the gear 87 which has the reduced clutch tooth portion 88 adapted in one position of the gear 87 to mesh with the internal clutch teeth 89 of the gear 83 for clutching the gear 83 to the shaft 60 to provide drive thereof from the shaft. In a shifted position of the gear 87 produced by operation of the yoke 90 controlled by the arm 92, the gear 87 is moved to the right into meshing engagement with a gear 93 mounted upon a lay shaft 94 and having the gear portion 95 arranged in constant meshing engagement with the gear portion 96 of a second ear indicated generally at 97 mounted on the output shaft 29. In this position the shaft 60 through the gear 87 drives the gear 93 which in turn through the gear portion 95 imparts reverse rotation to the gear portion 96 of the gear 97. The gear 87 thereby constitutes the means, manually operable, for operatively coupling the countershaft 60 to the reverse gear train or other gear 83.

The gear 97 is somewhat similar to the gear 52 having the two side flange portions 98 and 99 provided with serrations 100 corresponding to the serrations 63. The flanges 98 and 99 are conjointly secured to the gear 96 by means of studs 102, and the assembly thereby encloses the intermediate member 103 splined to the shaft 29. The intermediate member 103 is provided with pistons 104 corresponding to the pistons 65 arranged in circumferentially spaced relation and operated by fluid pressure for expansion to clutch the gear 96 to the shaft 29. These pistons and the cylinder associated therewith constitute the selective means for coupling either gear 52 or gear 97 to output shaft 29.

Considering the separator member 73 in more detail, it will be noted that this member is mounted within the cylindrical bushing 106 carried in the bore of shaft 29 and is provided with three flutes engaging the internal annular surface of the bushing 106 to provide three longitudinal passageways 107, 108 and 109. The passageway 109 is connected through the passageway 67 for controlling the operation of the pistons 65 to clutch the gear 55 to the shaft 29. The passageway 108 is arranged to receive fluid which is forced therethrough, and thence through the passageway 110 and the port 112 in the hub portion of the intermediate member 103 to actuate pistons 104 for clutching gear 96 to shaft 29. The third passageway 107 communicates with the port 28 for allowing leakage fluid from the torque converter to pass through the port 28 and thence through the passageway 107 from whence it is directed through ports 70 and ports 113 for lubricating the hub portions of flanges 98 and 99 which are freely rotatable about shaft 29 on needle roller bearings.

Immediately to the rear of the outer flange 98 of gear 97 there is provided a separator member 114 in the form of a gear having driving engagement with a suitable pump, which pump develops a fluid pressure in accordance with the speed of rotation of the gear 114. This fluid pressure is therefore responsive to the speed of the vehicle, since the gear 114 is mounted on the output shaft and thus rotates in direct ratio with the speed of the vehicle. Disposed between the member 114 and the bearings 115 for rotatably supporting the end of the shaft 29 are distributor members 116 and 117, respectively, arranged for communication with fluid conduit lines 118 and 119, respectively. When fluid under pressure is introduced into the line 118, for example, the distributor member 116 allows this fluid to be introduced to the passageway 108 of separator member 73, and consequently into the intermediate member 103 for clutching the gear 97 to the shaft. When fluid under pressure is forced into the conduit 119 the distributor member 117 allows this fluid to pass through passageway 120 and into the passageway 109 of the separator member 73. It is not believed necessary to describe in detail the construction of the distributor members, since these are the subject matter of a copending application of Burton J. Mills, filed August 9, 1944, Serial No. 548,741, now Patent No. 2,419.906 issued April 29, 1947.

Mounted on the shaft 29 beyond the bearings 115 is the speedometer gear member 122 which drives the speedometer worm 123 leading to the speedometer of the vehicle. A suitable brake supporting member 124 is mounted on the rear wall of the transmission 44 and at its outer end supports the brake shoe 125 in any conventional manner. The shaft 29 receives the flange member 126 which in turn is connected to the spider portion 127 of a brake drum 128. A suitable actuating shaft 129 controlled by the lever 130 operates to expand the brake member 125 into engagement with the drum 128 to provide a service or parking brake.

Figure 2:
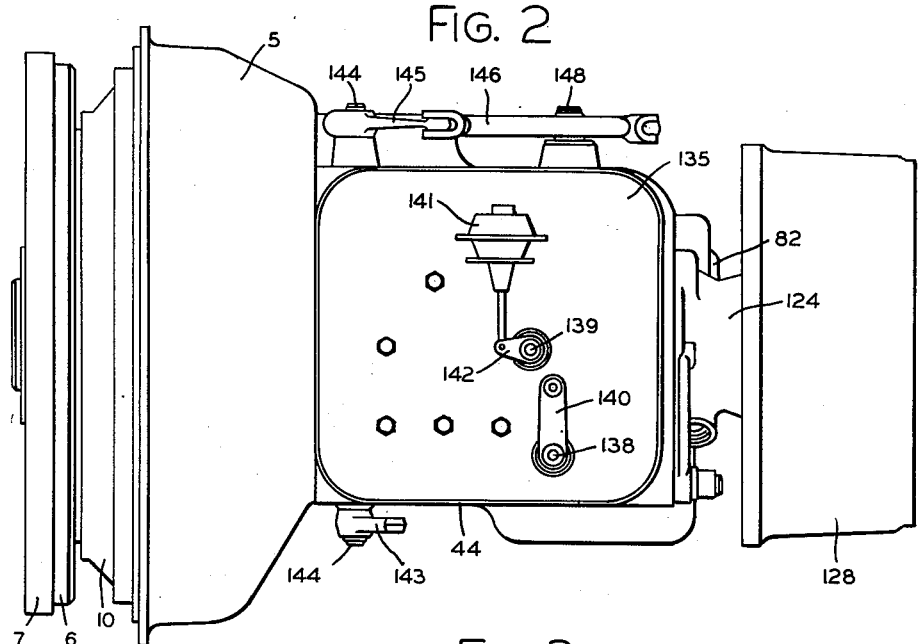
Figure 2 is a top plan view of the transmission shown in Figures 1A and 1B.
Figure 3:
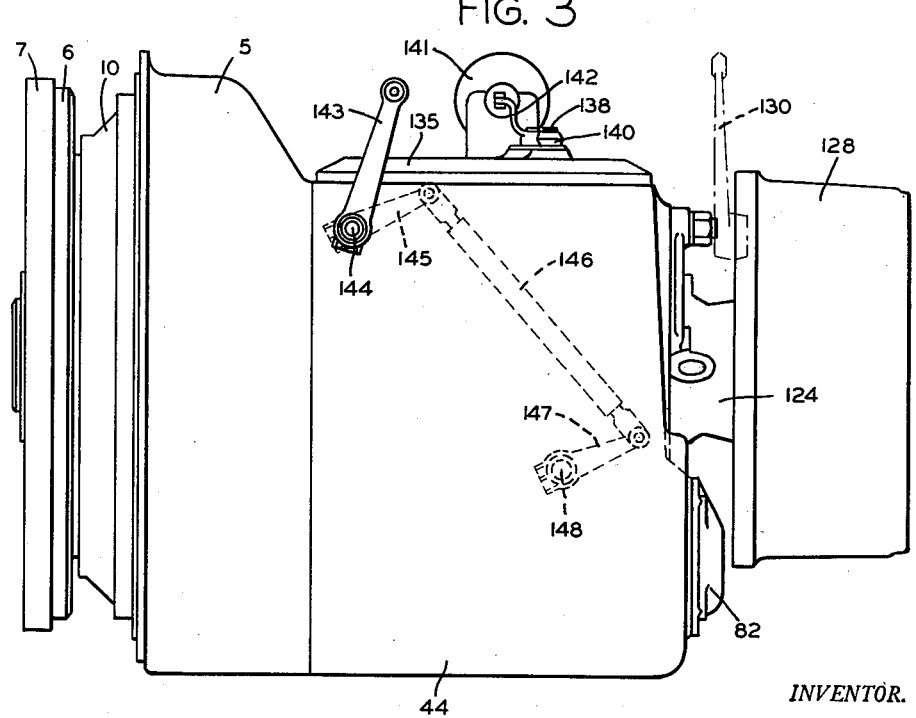
Figure 3 is a side elevation of a transmission shown in Figure 2.
Figure 4:
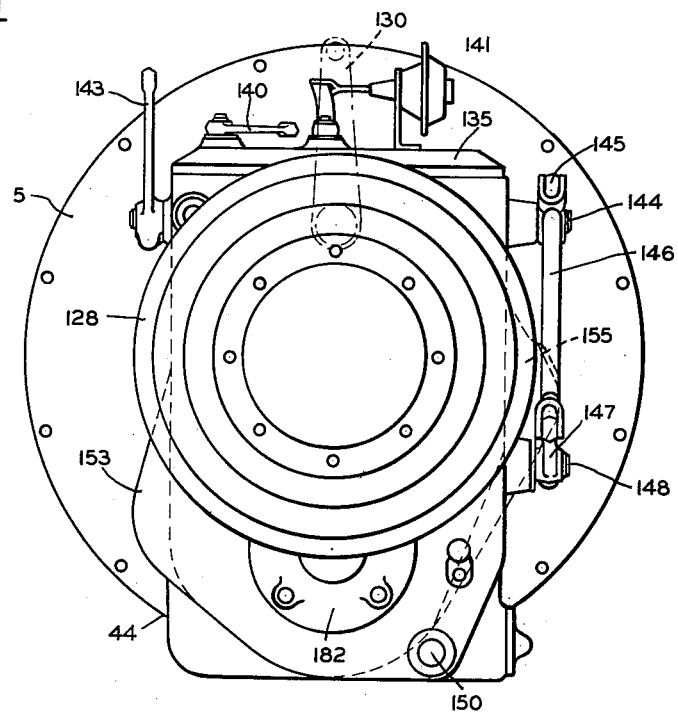
Figure 4 is an end view of the transmission shown in Figure 3.

Considering Figures 2, 3 and 4 of the drawings, similar reference numerals have been employed to designate corresponding parts of all these views. It will be noted that the transmission housing 44 is provided with a top or cover plate 135 bolted or otherwise secured thereon. The under surface of the cover receives the control valve 136 shown in more detail in Figures 6 to 10. Also mounted on the cover 135 are a pair of actuating shafts 138 and 139 which project through the plate 135 and on their outer ends are provided with arms 140 and 142 respectively. The shaft 138 is connected through the arm 140 to a manually operated lever preferably mounted at a remote point such, for example, as on the steering post of a vehicle beneath the steering wheel. The arm 142 is connected in any suitable manner to a throttle responsive mechanism such as the diaphragm operated member 141 responsive to the vacuum in the intake engine manifold. The operation of these two shafts and their associated lever arms in conjunction with the control of the transmission will be described in detail hereinafter.

Mounted upon the side of the transmission there is provided a crank arm 143 which is securely mounted on a transverse shaft 144 extended entirely through the housing 44 and at the opposite side thereof having the lever 145 secured thereto. The lever 145, in turn, through the adjustable link 146 is connected to a second lever 147 mounted on the projecting end of the shaft 148. The shaft 148, as shown in Figure 1B, has mounted thereon within the transmission the arm 92 which operates to actuate the shifting mechanism for the gear 87. The lever 143 through suitable control mechanism is connected to a control lever adjacent the operator of the vehicle whereby by rotating the lever 143 in a counterclockwise direction the gear 87 can be shifted from the position shown in Figure 1B to a position in which it will be in meshing engagement with the gear 93.

It should be noted that the transmission case 44 adjacent the lower rear end thereof is provided with a drain plug 150 having a filter portion 152 within the interior of the transmission housing. Also the housing itself is provided with the laterally offset portion 153 which accommodates the shaft 94, this shaft being disposed laterally of and intermediate the horizontal planes of the shafts 29 and 60. Also, on the opposite side of the transmission housing there is provided an offset portion 155 which is adapted to receive the gear pump operated by the gear 32 shown in Figure 1A, this pump being diagrammatically shown in Figure 5 to which reference will now be made.

Figure 5:
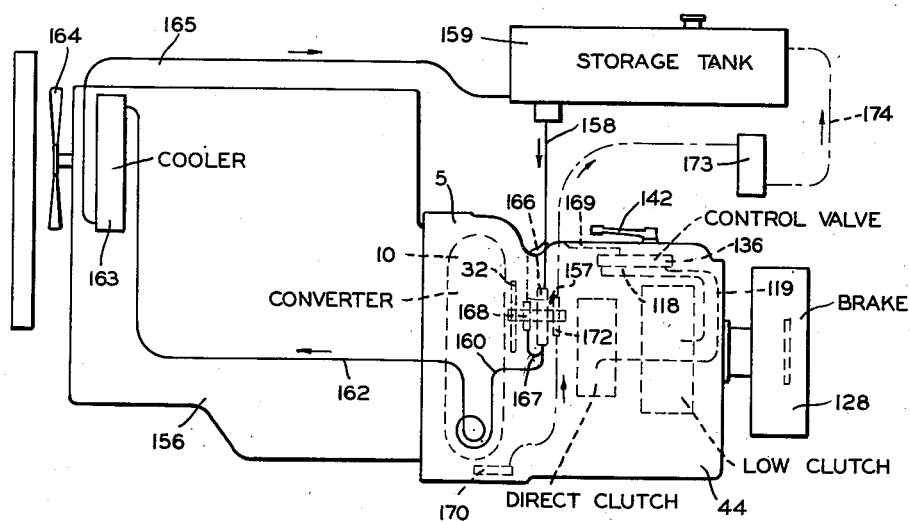
Figure 5 is a somewhat diagrammatic illustration of the fluid control circuit for the torque converter and the gear shifting mechanism as embodied in the present invention.

In Figure 5 the prime mover or engine of the vehicle is shown generally at 156 and has connected thereto the housing 5 of the torque converter and, of course, the housing 44 of the transmission. The converter itself is indicated at 10, and it will be noted that the gear pump indicated generally at 157 actually has three gear portions, it being understood that the pump is of the geared rotor type and is adapted to receive fluid from the conduit 158 leading from the lower end of storage tank 159 and to force it under pressure through conduit 160 and passageway 38 shown in Figure 1A into the torque converter 10. From the torque converter this fluid is discharged through the conduit 162 into a cooler 163 mounted adjacent the engine and preferably driven from the crank shaft thereof and disposed adjacent the engine fan 164. From the cooler the fluid passes through conduit 165 back to the storage tank 159. The outlet or pressure side of the pump 166 has a second conduit 167 leading into the high pressure pump portion 168 where the fluid is forced under a considerably higher pressure into the line 169 leading to the control valve 136. It will be noted that a portion of the conduit 169 is formed within the cover plate 135 of the transmission housing and leads into the control valve. From the control valve there are two conduits 118 and 119, respectively, also shown in Figure 1B, the conduit 118 leading to the low speed clutch for the gear 96 and the conduit 119 leading to the direct drive clutch which clutches the gear 52 to the shaft 29. The position of this control valve as determined by the speed and load responsive means, to be described hereinafter, thus selects which of the piston means is actuated and consequently, which gear is selectively coupled to the output shaft 29. Suitable vents from the clutches and also from the control valve allow the unused fluid to be discharged into the lower end of the transmission housing and into the sump indicated generally at 170 in Figure 1A. From this sump 170 fluid is drawn by the third section of the pump 157 indicated at 172 into the filter 173 where any dirt or foreign matter is filtered out, and thence through conduit 174 back to the storage tank 159. It will be noted that the filter 173 is arranged to receive the sump fluid in the top thereof and to discharge the fluid through the lower end thereof back to the storage tank. This eliminates return of any entrapped air or the like to the storage tank, since both the control circuit fluid for operating the two clutches and the torque converter fluid are drawn from the same storage tank. It should be noted that with this construction the oil discharged from the pump section 166 and introduced into the pressure pump section 168 is already under pressure, this being a pressure corresponding to the pressure of fluid used in the torque converter. As a result, the pump section 168 merely needs to add to this fluid a sufficient additional amount of pressure to insure operation of the clutches for the gears 52 and 97. Such a pressure I have found in one form of the invention to be of the order of 150 pounds per square inch which can be readily developed by this pump construction.

Considering now the control valve mechanism 136 which has been previously referred to as being located on the under surface of the transmission cover 135. This structure is shown more clearly in Figure 6. The control valve comprises a valve body member 200 provided with lug portions 202 whereby it can be bolted as by means of bolts 203 to the under surface of the cover 135. The conduit 169 which leads from the high pressure pump section 168 through the cover 135 provides for introduction of oil under pressure into the control valve through the port 204 shown in Figure 6. This port opens into a cylindrical passageway 205 formed in the valve body and preferably receiving the plunger 206 which is arranged for reciprocatory movement within the bore 205.

The plunger 206 has a projecting end provided with a pocket or recess 207 adapted to receive the end 208 of the control arm 209 which arm is secured to the inner end of the shaft 138 projecting through the cover 135 and having on its outer end the arm 140 connected to the manually operable lever mounted beneath the steering wheel. In the position shown in Figure 6 the shaft 138 has been shifted to a neutral position, and consequently the plunger 206 is in a neutral position and is retained in this position by the detent ball 210 seated in a recess 212 formed in the plunger 206, the ball 210 being held in the recess by means of the spring 213 biased against the inner end of a stop nut 214. The plunger 206 adjacent the end opposite the recess 207 is provided with oppositely disposed flatted portions 215 which provide communication with the port 204 for leading fluid under pressure from the conduit 169 through port 204 and the channels 215 to the reduced portion 216 of the plunger.

Figure 6:
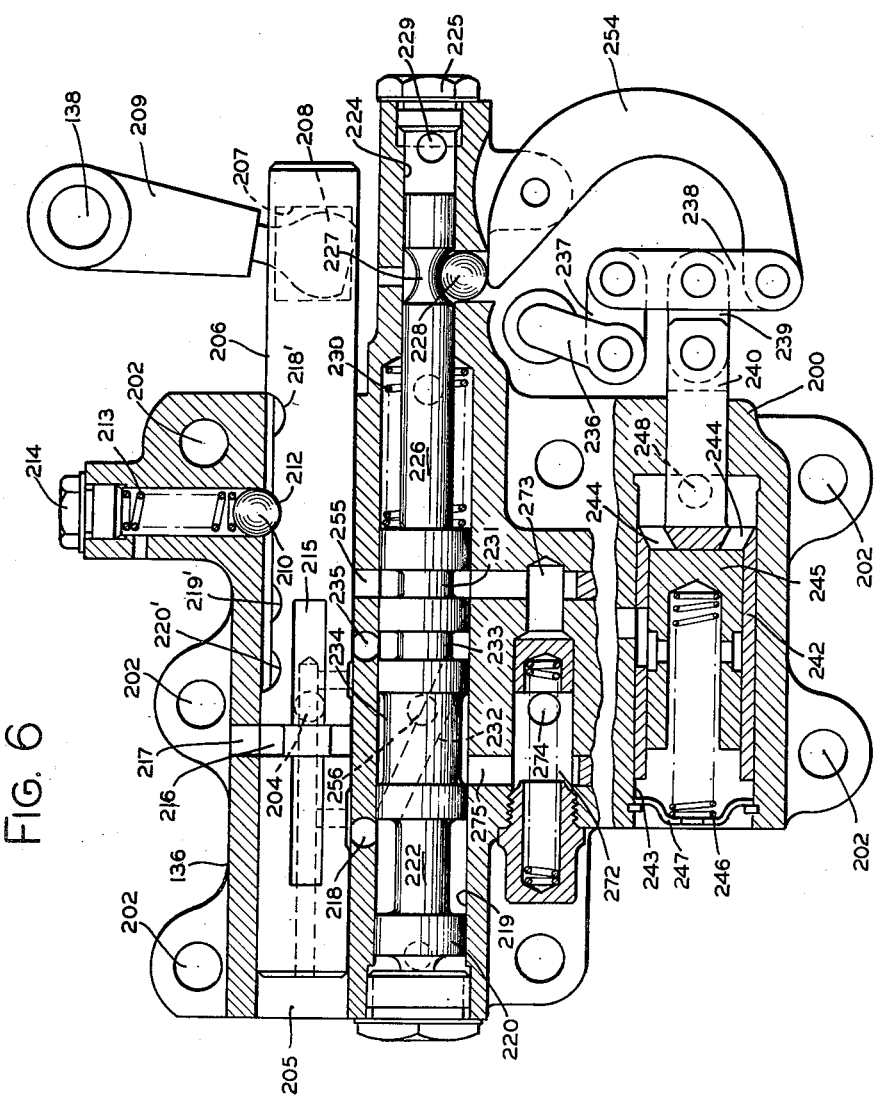
Figure 6 is a sectional view through the control valve mechanism in neutral position.

In the neutral position shown in Figure 6 the reduced portion 216 of the plunger is disposed in alinement with the vent port 217 whereby the fluid developed by the pump section 168 is merely vented so that no control operation is effected.

The plunger 206 is also provided with detent seats 218', 219' and 220', respectively. When shifted into a position where the ball 210 sets in the seat 218' the plunger is disposed in the position shown in Figure 7 which corresponds to a movement of the manual control lever for automatic operation of the transmission. In this position it will be apparent that the operating fluid enters through the port 204 and enters through the port 204 and thence through the channels 215 and is directed to the reduced portion 216 of the plunger 206. However, the plunger in this case has been shifted into a position where the reduced portion 216 is out of alinement with the vent 217 but is in alinement with a port 218 opening into a second bore 219 formed in the valve body 136. Within the bore 219 there is provided a plunger member 220 which is slideable axially therein and which has a reduced portion 222 into which the port 218 opens when the plunger is in position shown in Figure 7. The bore 219 of the valve body is closed at one end by means of the stop plug or nut 223, and at its opposite end is provided with a reduced portion 224 closed at its end by corresponding plug 225. Within the reduced bore 224 there is slideably mounted a second plunger 226 abutting against the end of plunger 220 and having a reduced or necked portion 227 adapted to control the operation of a ball member 228 allowing the ball to move inwardly when the necked portion 227 is alined with the ball but forcing the ball outwardly when the plunger is shifted to the right. Adjacent the end of the reduced portion 224 there is provided a port 229 which is connected with the pressure side of the pump operated by gear 114, which pump is described in detail in my copending application Serial No. 519,049, filed January 20, 1944, now Patent No. 2,433,954 issued January 6, 1948. This fluid pressure is in direct proportion to the speed of the vehicle and operates against the adjacent end of plunger 226 for controlling the movement thereof and thereby holds the plunger against the end of plunger 220, this holding force being augmented by the pressure of spring 230 mounted within the enlarged bore 218 and also acting against the end of plunger 220. Thus the gear 114, which drives the speed responsive pump, and the arm 142, connected to the throttle controlled diaphragm, constitute the mechanism for controlling the speed and load responsive means shown in the valve mechanism of Figure 6 to 10 inclusive.

Figure 7:
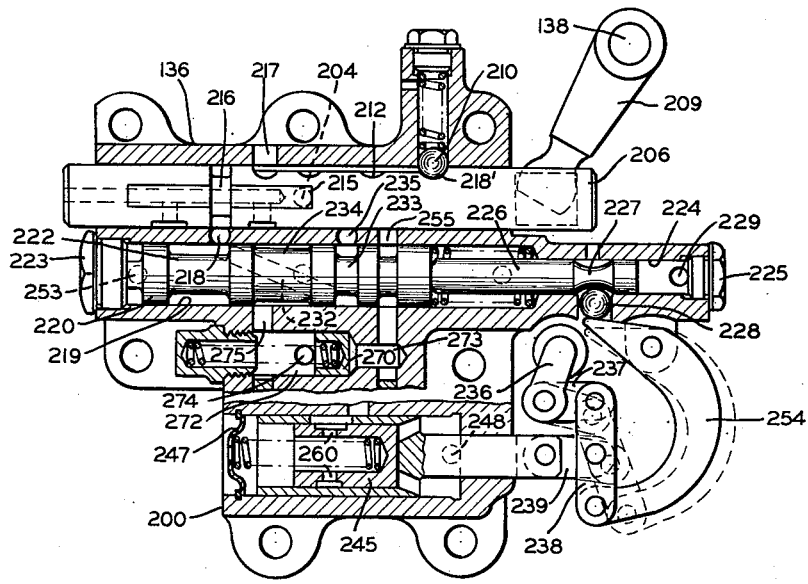
Figure 7 is a corresponding view of the control valve mechanism in automatic low position.

The plunger 220 is provided with an angularly extending bore 232 which allows passage of fluid from the reduced portion 222 to a second reduced portion 233 thereby bypassing the intermediate reduced portion 234 in the position shown in Figure 7. Thereby the operating fluid under high pressure passes through the port 218 into and around the reduced portion 222 of the plunger 220 and thence through the diagonal passageway 232 into and around the reduced portion 233 of plunger 220. From here the fluid passes into the port 235 which leads to the conduit 118 and from this conduit through separator or divider 116 into the passageway 108 and thence into the port 110 and passageway 112 into the chamber intermediate pistons 104, expanding these pistons for clutching gear 97 to shaft 29. Since at this time the control lever 143 has not been actuated, gear 87 is in clutching engagement with countershaft gear 83, and since the torque converter is imparting torque to the countershaft through the rotor driven shaft 14, gears 49 and 50 and thence through gear 55 and countershaft 58 it is apparent that this torque is transmitted from the gear 83 to the gear 97 and thence to the shaft 29 providing an automatic low speed drive of the vehicle.

As the vehicle is under load under these conditions the throttle responsive lever 142 is in high vacuum position as shown in full lines in Figures 6 and 7 and the shaft 139 to which this lever is connected has on its inner end the arm 236 connected thereto, which arm is in the position shown. This arm through link 237 and rocker arm 238 is connected to a link 239 pivotally mounted on rocker arm 238 at its midpoint. The link 239 in turn is connected to the extending end 240 of a control valve member having a sleeve valve portion 242 mounted within the bore 243 of the valve body 136. The sleeve valve 242 has ports 244 formed therein for allowing pressure exerted against the end of the sleeve valve 242 to be directed against the corresponding end of a telescoping sleeve valve member 245 which member is normally urged into its limiting position by means of spring 246 mounted in the sleeve valve member 245 and biased at its opposite end against a stop washer 247. Within the bore 243 at the right-hand end thereof there is provided a port 248 which is also connected to the speed responsive pump having common connection with the port 229 thereto. The arm 236, together with piston 242 and sleeve 245 thus constitutes the speed and load responsive means within the valve mechanism 206. Since the vehicle speed at this time is not sufficient to produce sufficient pressure at the pump driven by gear 114, the inner sleeve valve member 245 remains in position against the port 244 until such time as the speed responsive pump pressure is sufficient to move the member 245 to the left against the spring 246.

With the vehicle moving forwardly in low speed, that is with gear 97 clutched to the output shaft 29, a reduced driving ratio is provided from the torque converter shaft 14 to the rear axle of the vehicle.

As the vehicle accelerates and gains speed the pressure of the speed responsive pump driven by gear 114 increases. At the same time the load on the engine tends to decrease. At some point which is predetermined by proper adjustment, the throttle control mechanism including the diaphragm member 141 operates to move the arm 236 from the position shown in full lines in Figures 7 and 8 to the dotted line position in Figure 8. As this movement occurs, sleeve valve 242 is drawn forwardly or to the right from the position shown in Figure 7 to that shown in Figure 8, and because of the increased pressure effective through port 248 and the increased exposed area of the inner sleeve 245 the latter is forced rearwardly against the force of spring 246. This uncovers the port 250 of the valve member 242 opening this port for communication through port 252 and thence allowing oil under pressure to pass from port 252 through a suitable conduit into a port 253 of the cylinder 219. Since the plunger 220 is larger in diameter than the plunger 226, the introduction of pressure into the left-hand end of cylinder 219 moves plunger 220 to the right, and consequently moves plunger 226 to the right, forcing the ball 228 outwardly thereby rocking the arcuate lever 254 in a counterclockwise direction from the position shown in full lines in Figure 7 to the dotted line position of that figure or to the full line position of Figure 8. The shifting of the plunger 220 to the right causes the clutch operating fluid from port 204 to pass through the reduced portion 216 of plunger 206, thence through the port 218 into the space around the reduced portion 222 of plunger 220. From this point the fluid passes through the port 275 into cylinder 272, where valve 270 is held in position closing passageway 273 by means of a spring. Consequently, the fluid under pressure passes through port 274 connected to the conduit 119. From this conduit the fluid under pressure passes through the distributor 116 into the longitudinal passageway 109 of separator 73 and from the passageway 109 through port 67 into the space between the pistons 65. Simultaneously with this movement of the plunger 220, however, the port 235 which is the port for controlling the operation of the clutches in the gear 97 is vented around the reduced portion 234 of plunger 220 and thence through the vent port 256 in the cylinder 219 so that the springs between the pistons 104 retract, these pistons upon reduction of pressure disengaging the gear 97 from the shaft 29 at the same time that the gear 52 is clutched to the shaft 29. The plunger 226 thus constitutes the means for selectively connecting the fluid pressure receiving ports in valve mechanism 206 with either the conduit 118 or conduit 119 to energize selectively the clutches in gears 97 and 52, and correspondingly vent the unenergized clutch mechanism.

It will thus be seen that by this operation the transmission has been shifted from low speed drive to direct drive. Simultaneously with this shifting of gears in the transmission the throttle responsive arm 236 is moved back to the full line position of Figure 8 from the dotted line position, since the engine is now under additional load and draws the sleeve valve 242 into a position still holding ports 250 and 252 in alinement. The transmission will stay in the position produced by this shifting of the sleeve valve member and maintain the gear 52 engaged until such time that the speed of the vehicle drops to a point where the pressure of the fluid developed by the pump driven by gear 114 is insufficient to hold the sliding valve 245 in a position opening the port 250 of valve 242 to communication with ports 244.

Closing of the port 250 results in the sleeve member 245 moving back to the position shown in Figure 7 and its ports 260 thereupon provide for venting of the port 252 out through the stop member 247. This vents the left-hand end of cylinder 219 and since there is still pressure effective in port 229 this pressure plus the effect of spring 230 will move the piston 220 to the left, closing off the port 275 from the influence of the clutch operating fluid entering through port 204 and reopening the port 235 to this fluid, thereby disengaging gear 52 from shaft 29 and reengaging gear 97, thus shifting the transmission back to a low ratio drive.

Thus, it will be seen that with the arm 209 shifted into a position providing for automatic driving of the transmission the arm 236 under the control of engine throttle conditions and the fluid pressure developed at ports 229 and 248 will automatically control the selective operations required for clutching gears 97 or 52 to shaft 29, depending upon the existing speed and load conditions in the vehicle.

Figure 8:
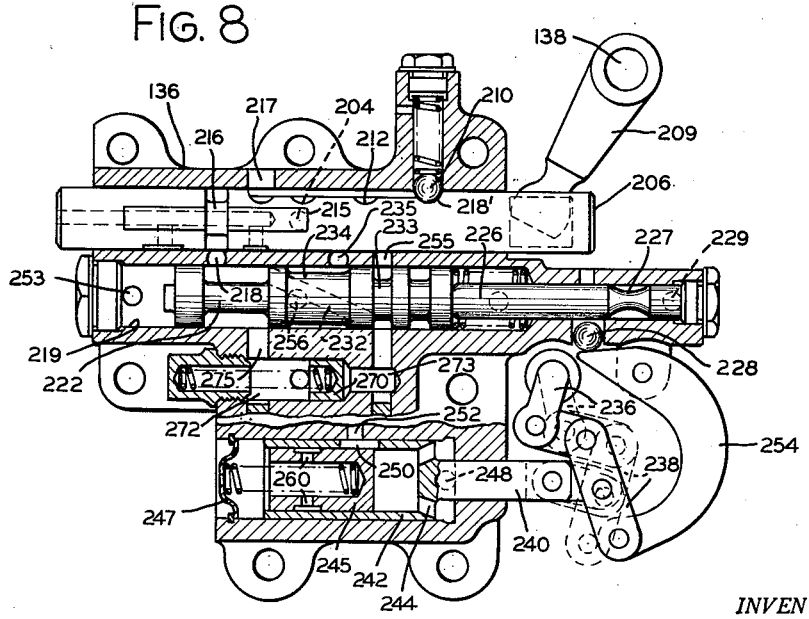
Figure 8 is a corresponding view of the control valve mechanism in automatic high position.
Figure 9:
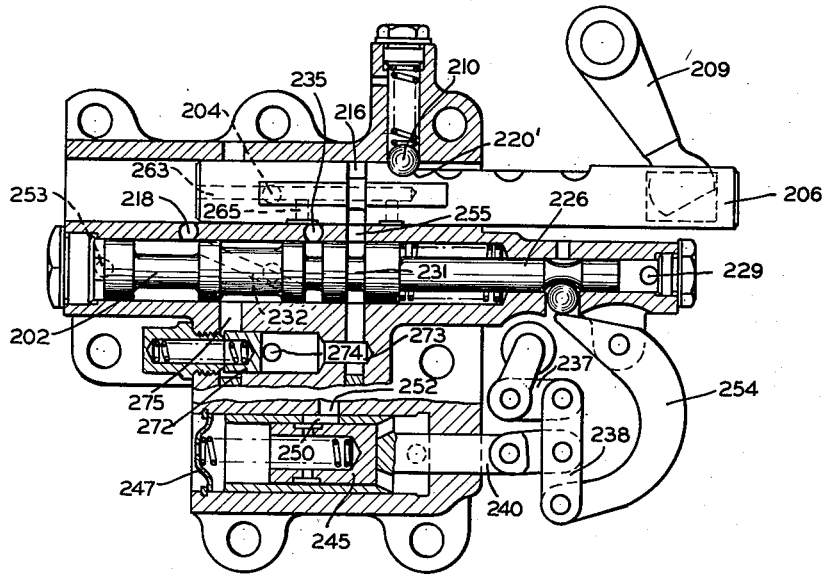
Figure 9 is a view showing the control valve in manual forward drive.
Figure 10:
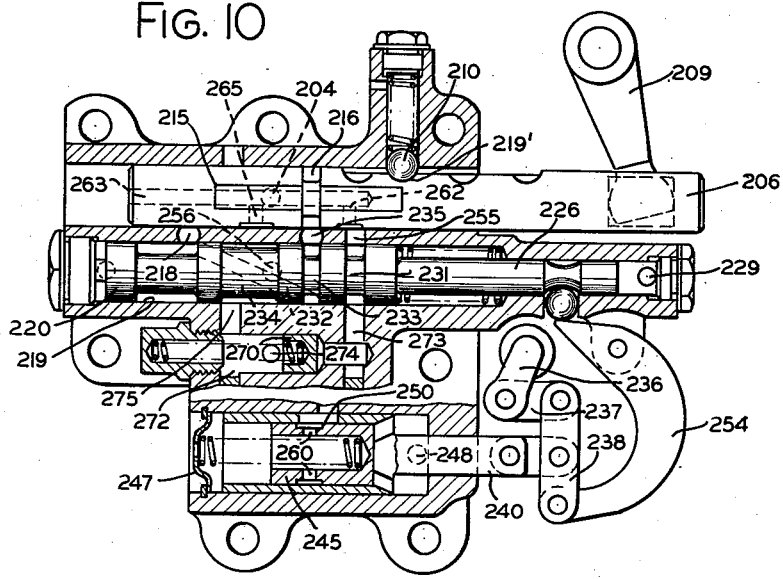
Figure 10 is a corresponding view of the control valve mechanism in manual reverse drive.

If manual control of the vehicle is desired, the arm 209 is shifted from the position shown in Figures 7 and 8 back through the neutral position shown in Figure 6 and into the opposite position shown in Figures 9 and 10, Figure 9 showing a position of plunger 206 for manual forward drive and Figure 10 showing the position of plunger 206 for manual reverse drive, in which the gear 87 has been shifted to a reverse control position by counterclockwise movement of lever 143. If arm 143 has not been operated, however, the two positions of plunger 206 shown in Figures 9 and 10 will give manual speed control for forward drive which will now be discussed.

Considering Figure 10, with the plunger 206 shifted into a position such that the detent ball 210 is disposed in detent 219′ and with the lever 143 in a position engaging the clutch portion of gear 187 with the gear 83 on the countershaft, it will be noted that the port 204 is in communication through the channels 215 and the reduced portion 216 of the plunger directly with the port 235. Simultaneously, the port 275 will be vented around the reduced portion 234 of plunger 220 through the vent opening 256 formed in the bore 219 so that the pistons 65 of the gear 52 will be vented through this passageway resulting in the gear 52 running free upon the shaft 29. At the same time the clutch operating fluid under pressure from port 204 is directed into port 235 and thence through conduit 118 and passageway 108 for operating the pistons 104 to clutch gear 97 to shaft 29 thus engaging the low speed drive of the vehicle by manual control of the operator shifting arm 209 to the position shown in Figure 10.

Since the plunger 206 is held in the position shown in Figure 10 it is immaterial what pressures are operating at ports 229 and 248 inasmuch as the shifting movement of the plunger 220 will not result in disturbing the direct connection of the reduced portion 216 of the plunger 206 with the port 235. Further, no pressure can escape from port 235 through the reduced portion 233 of plunger 220 and thence through the diagonal passageway 232 and port 218 since port 218 is closed by the plunger 206. However, if the speed of the vehicle should exceed a predetermined amount such as to force the sliding valve 245 into a position opening up port 250 to the pressure from the speed responsive pump into port 248 and the plunger 220 should be shifted to the right, this would result in disengagement of the gear 52 from shaft 29, since port 235 could then communicate through the reduced portion 234 of plunger 220 and the vent port 256 located in vent 219. Consequently, this manual forward drive can be used only under conditions such that this pressure from the speed responsive pump is not developed.

If it is desired to shift from low speed manual forward condition to direct drive manual forward condition the arm 209 is rotated still further in a counterclockwise direction as shown in Figure 9, moving plunger 206 into position where ball 210 seats in the recess 220′. In this position, which is shown in Figure 9, the port 204 is in direct communication with the port 255 leading to the gear pistons 65 through the reduced portion 231 of plunger 220 thence through passageway 273 against valve 270, which thereupon moves to the left against its spring pressure, closing port 275 and uncovering port 274 which is connected to conduit 119, thereby effecting clutching of the gear 52 to the shaft 29. At the same time the port 235 is vented through the diagonal passageway 232 and the port 218, and also through the vent port 265 into the passageway 263 formed axially in the piston 206. Thus the gear 97 is immediately disengaged from shaft 29 as the gear 52 is clutched thereto. In this position it will also be noted that the left-hand end of cylinder 219 is vented through port 253 and ports 252 and 250 outwardly through the sleeve valve member 245 and the stop member 247 so that the piston 220 will stay in the position shown.

If is it desired to provide a reverse drive the arm 143 is rotated counterclockwise from the position shown in Figures 2 and 3 into a position where the gear 87 is in engagement with the gear 93. This shift is effected manually by the operator. If the arm 209 is then shifted into position shown in Figure 10 a reverse drive is effected by clutching gear 97 to the shaft 29 through operation of the fluid pressure through port 235 to conduit 118 and thence along passageway 108 to actuate pistons 104 which clutch gear 97 to shaft 29 and through gear 87 and the gear 93—95 effect reverse drive thereof in the reduced speed ratio. Simultaneously gear 52 is declutched since piston 206 in the position shown in Figure 10, vents the right-hand end of cylinder 272 through passageway 273, reduced portion 231 of plunger 220, port 255 and vent passageway 262 leading into bore 263. Manual forward drive in high or direct under these conditions may be effected by shifting arm 209 into the position shown in Figure 9 which vents port 235 to disengage gear 97 and simultaneously introduces fluid under pressure into port 255 to couple gear 52 to the shaft through pressure against valve 270 uncovering port 274.

It is to be understood that during the manual control of the transmission it is not desired that the vehicle be operated at any great speed, since this manual control is for parking purposes when slight forward and reverse movements of the vehicle are desired, or for manual operation under extreme conditions to get the vehicle moving but not for normal operation of the vehicle. Consequently, the speed responsive pump driven by gear 114 is never operated at a speed sufficient to develop a pressure operative of itself for actuating the sleeve valve 245. If too high pressures are developed under such conditions as illustrated in Figure 9, the sliding plunger 220 arranged in the cylinder 219 will move to the right, thereby opening the port 255 through the reduced portion 233 of plunger 220 and through passageway 232 to the vent port 218 thereby venting the fluid pressure necessary to operate the pistons 65 and thus preventing the operation of the transmission at too high speed. Under the positions of the control valve ports as shown in Figure 10 with the clutch portion of gear 87 engaged with the gear 83 to clutch the latter to the countershaft 60, or with the clutch 87 engaged with the reverse gearing to effect either a low forward drive or reverse drive, shifting of the plunger 220 to the right as viewed in the drawing would align the reduced portion 234 thereof with port 235 and the fluid under pressure delivered thereto through reduced portion 216 of plunger 206 would be vented through the port 256.

It is therefore believed apparent that the present transmission is capable of normal automatic operation in a forward direction upon selection by the operator moving the arm 299 to the position shown in Figures 7 and 8. During this automatic operation the shifting from low speed to direct drive in the gear box is accomplished automatically in accordance with engine throttle position and the speed of the vehicle. When it is desired to park the vehicle the mechanism must be shifted through neutral position shown in Figures 9 and 10, providing for operation either in a manual forward or manual reverse, depending upon whether gear 87 is shifted out of the position shown in Figure 1B.

I do not intend to be limited to the exact details of the transmission construction and control system herein disclosed as a preferred form of my invention, but only insofar as described by the scope and spirit of the appended claims.

I claim:

1. In a combined fluid torque converter and transmission unit having a plurality of change speed gear trains, means for selectively clutching said gear trains into the drive train of said unit, including fluid pressure-responsive clutch means, control valve means therefor, an engine for driving the impeller of said converter, a pump driven by said impeller including a first stage for delivering fluid under pressure to said converter, a second stage for receiving a portion of the fluid under pressure from said first stage and delivering said fluid under a higher pressure to said control valve means, and a third stage for returning leakage fluid to a storage reservoir, and pump means driven by said drive train for selectively actuating said control valve means in accordance with engine speed.

2. In combination, a transmission including an output shaft, change speed gear trains including rotatable gears on said shaft, pressure controlled clutch means for selectively clutching said gears to said shaft, a control valve for said clutch means, a torque converter having a driving element and a driven element, said driven element transmitting torque to said gear trains, a pump driven by said driving element and having a first stage for delivering fluid under pressure to said converter, and a second stage receiving a portion of said first stage fluid and delivering it at a higher pressure to said control valve, and automatic torque and speed responsive means operable to actuate said control valve for selective delivery of fluid under pressure to said clutch means.

3. The combination of claim 2 including manually controlled overriding means in said control valve for selective actuation of said clutch means.

4. The combination of claim 2 including manually shiftable means in said control valve rendering said valve operative for manual selection of said clutch actuating means, said automatic means limiting the speed of operation under said manual control.

5. For use with a fluid torque converter and transmission unit having a plurality of change speed gear trains and fluid pressure controlled clutch means for selectively clutching the gear trains into the drive train of the transmission unit, the combination of, a control valve mechanism, a first pump element for delivering fluid under pressure to the fluid torque converter, and a second pump element for receiving a portion of the fluid under pressure from said first pump element and delivering the fluid under a higher pressure to said control valve mechanism, where it is directed to the fluid pressure controlled clutch means.

6. For use with a fluid torque converter and transmission unit having a plurality of change speed gear trains and fluid pressure controlled clutch means for selectively clutching the gear trains into the drive train of the transmission unit, the combination of, a control valve mechanism for selectively admitting fluid under pressure to the fluid pressure controlled clutch means, a fluid reservoir, a first pump element for drawing fluid from said fluid reservoir and delivering the fluid under pressure to the fluid torque converter, a second pump element for receiving a portion of the fluid under pressure from said first pump element and delivering the fluid under a higher pressure to said control valve mechanism where it is directed to the fluid pressure controlled clutch means, and a third pump element for returning leakage fluid to said fluid reservoir.

7. For use with a fluid torque converter and transmission unit having a plurality of change speed gear trains and fluid pressure controlled clutch means for selectively clutching the gear trains into the drive train of the transmission unit, the combination of, a control valve mechanism for selectively admitting fluid under pressure to the fluid pressure controlled clutch means, a pump including a first stage for delivering fluid under pressure to the fluid torque converter, and a second stage for receiving a portion of the fluid under pressure from said first stage and delivering the fluid under a higher pressure to said control valve mechanism where it is directed to the fluid pressure controlled clutch means.

8. For use with a fluid torque converter and transmission unit having a plurality of change speed gear trains and fluid pressure controlled clutch means for selectively clutching the gear trains into the drive train of the transmission unit, the combination of, a control valve mechanism for selectively admitting fluid under pressure to the fluid pressure controlled clutch means, a fluid reservoir, a pump including a first stage for drawing fluid from said fluid reservoir and delivering the fluid under pressure to the fluid torque converter, a second stage for receiving a portion of the fluid under pressure from said first stage and delivering the fluid under a higher pressure to said control valve mechanism where it is directed to the fluid pressure controlled clutch means, and a third stage for returning leakage fluid to said fluid reservoir.

9. For use with a fluid torque converter and transmission unit having a plurality of change speed gear trains and fluid pressure controlled clutch means for selectively clutching the gear trains into the drive train of the transmission, the combination of, a control valve mechanism for selectively admitting fluid under pressure to the fluid pressure controlled clutch means, a fluid reservoir, a pump including a first stage for drawing fluid from said fluid reservoir and delivering the fluid under pressure to the fluid torque converter, a second stage for receiving a portion of the fluid under pressure from said first stage and delivering the fluid under a higher pressure to said control valve mechanism where it is directed to the fluid pressure controlled clutch means, and a third stage for returning leakage fluid to said fluid reservoir, and pump means for selectively actuating said control valve mechanism in accordance with engine speed.

ROBERT LAPSLEY.

REFERENCES CITED

The following references are of record in the file of this patent:

UNITED STATES PATENTS

| Number    | Name    | Date          |
|-----------|---------|---------------|
| 2,223,715 | Berger  | Dec. 3, 1940  |
| 2,352,004 | Pollard | June 20, 1944 |
| 2,377,696 | Kelley  | June 5, 1945  |
| 2,461,218 | Lapsley | Feb. 8, 1949  |